United States Patent
Gentry et al.

(10) Patent No.: US 7,640,197 B1
(45) Date of Patent: Dec. 29, 2009

(54) TECHNIQUE FOR FINANCIAL ACCOUNT INFORMATION PROCESSING

(75) Inventors: David Gentry, Duluth, GA (US); Mike Martin, Lawrenceville, GA (US)

(73) Assignee: Checkfree Corporation, Norcross, GA (US)

( * ) Notice: Subject to any disclaimer, the term of this patent is extended or adjusted under 35 U.S.C. 154(b) by 898 days.

(21) Appl. No.: 10/830,455

(22) Filed: Apr. 23, 2004

(51) Int. Cl.
*G06Q 40/00* (2006.01)

(52) U.S. Cl. ...................................................... 705/35

(58) Field of Classification Search .............. 705/35–44
See application file for complete search history.

(56) References Cited

U.S. PATENT DOCUMENTS

| | | | |
|---|---|---|---|
| 5,175,682 A * | 12/1992 | Higashiyama et al. ........ 705/45 |
| 5,237,159 A | 8/1993 | Stephens et al. |
| 5,305,196 A | 4/1994 | Deaton et al. |
| 5,642,485 A | 6/1997 | Deaton et al. |
| 5,689,579 A | 11/1997 | Josephson |
| 5,691,524 A | 11/1997 | Josephson |
| 5,832,463 A | 11/1998 | Funk |
| 5,832,464 A | 11/1998 | Houvener et al. |
| 5,930,778 A | 7/1999 | Geer |
| 6,164,528 A | 12/2000 | Hills et al. |
| 6,189,785 B1 | 2/2001 | Lowery |
| 6,547,132 B1 * | 4/2003 | Templeton et al. .......... 235/380 |
| 6,644,546 B2 * | 11/2003 | George et al. ............... 235/379 |
| 6,647,376 B1 | 11/2003 | Farrar |
| 7,062,463 B2 * | 6/2006 | Knapp ........................ 705/39 |
| 7,181,430 B1 | 2/2007 | Buchanan et al. |
| 7,191,151 B1 | 3/2007 | Nosek |
| 2002/0129001 A1 * | 9/2002 | Levkoff et al. ................. 707/1 |
| 2002/0138424 A1 | 9/2002 | Coyle |
| 2002/0178112 A1 * | 11/2002 | Goeller et al. ............... 705/39 |
| 2002/0194125 A1 * | 12/2002 | Shimada ...................... 705/40 |
| 2003/0130950 A1 | 7/2003 | Ahles |
| 2003/0163419 A1 * | 8/2003 | Asano et al. ................. 705/40 |
| 2004/0049456 A1 * | 3/2004 | Dreyer ........................ 705/40 |
| 2004/0236692 A1 | 11/2004 | Sellen |
| 2005/0091132 A1 | 4/2005 | Phillips et al. |
| 2005/0097050 A1 * | 5/2005 | Orcutt ......................... 705/45 |
| 2005/0137951 A1 * | 6/2005 | Michelassi et al. ........... 705/35 |
| 2005/0149440 A1 * | 7/2005 | Michelassi et al. ........... 705/45 |

OTHER PUBLICATIONS

Telecheck, Recognizing Innovative ACH Operating Practice, 2003.*
"NACHA Selects JPMorgan, Wells Fargo and TeleCheck for 2003 Kevin O'Brien ACH Quality Award." News Release, Apr. 28, 2003.
"TeleCheck, Recognizing Innovative ACH Operating Practices." 2003, pp. 33-36.

(Continued)

*Primary Examiner*—Hani Kazimi
*Assistant Examiner*—Olabode Akintola
(74) *Attorney, Agent, or Firm*—Sutherland Asbill and Brennan

(57) ABSTRACT

A technique for processing information associated with a financial account is provided. Multiple options for validating and/or altering financial account information exist. A priority value for each of the options is determined. The option having the highest priority value is selected. Then, the financial account information is validated and/or altered according to the selected option.

23 Claims, 8 Drawing Sheets

OTHER PUBLICATIONS

Final Office Action dated Dec. 11, 2007 for related U.S. Appl. No. 10/830,459, filed Apr. 23, 2004.
J&B Software White Paper (undated)—Accounts Receivable Check Conversion Evolution in the Banking Industry.
"Electronic Check Conversion." Electronic Ech Eft Payments, 2000, pp. 1-2, ePaymentSystems, Inc., Austin, TX. <http://www.epaymentsystems.com/ecc2.asp>.
"Electronic Check Recovery." Electronic Ech Eft Payments, 2000, pp. 1-2, ePaymentSystems, Inc., Austin, TX. <http://www.epaymentsystems.com/ecr2.asp>.
"POS Electronic Check Conversion." 2001, pp. 1-3, Accelerated Payment Systems, Inc., Mesa, AZ. <http://www.acceleratedpayment.com/posecc.htm>.
"Disclosure Under 37 C.F.R. § 1.56," Oct. 24, 2007.
Non-Final Office Action mailed May 15, 2008 for related U.S. Appl. No. 10/830,459, filed Apr. 23, 2004.
Final Office Action mailed Oct. 10, 2008 for related U.S. Appl. No. 10/830,459, filed Apr. 23, 2004.
Non-Final Office Action mailed Mar. 4, 2009 for related U.S. Appl. No. 10/830,459, filed Apr. 23, 2004.

* cited by examiner

TECHNIQUE FOR FINANCIAL ACCOUNT INFORMATION PROCESSING

FIELD OF THE INVENTION

The present invention relates to electronic transactions, and more particularly to validation and/or alteration of financial account information in generating electronic transactions.

BACKGROUND OF THE INVENTION

A majority of large financial institutions in the United States, which includes banks, credit unions, savings and loans, and other type financial institutions, utilize software to originate Automated Clearinghouse (ACH) transactions onto the Federal Reserve System's ACH network. The Federal Reserve System is the central bank of the United States of America, formed by an act of Congress. It consists of twelve Reserve Banks located in major cities throughout the United States. The ACH network electronically links the Federal Reserve Banks with financial institutions throughout the United States to support electronic funds transfer between the financial institutions. The most popular software package for originating ACH transactions is known as PEP+ and is a product of CheckFree, the assignee of the present application.

Corporate customers of these financial institutions submit received paper items and/or electronic transactions to their respective financial institutions for deposit into their accounts. A corporate customer account may be any type of financial account that can receive deposits, including checking and savings accounts. The deposits, typically payments, may be drawn against any type of demand deposit account, including, but not limited to, a checking account. Paper items are typically checks or drafts. These paper items are sometimes converted into electronic transactions. This process is known as Accounts Receivable Conversion (ARC), and the associated transactions are referred to as ARC transactions. A corporate customer, referred to herein as a remote client, can include, but is not limited to, a lockbox processor, another type of payment service provider, and a merchant or biller. A lockbox processor is an entity that provides a payment processing service to businesses, collecting and processing the payments a business receives and crediting the business's bank account. A merchant or a biller is an entity that issues bills for services rendered or goods purchased, a merchant may also receive payment at the time of delivery of sold goods or services.

CheckFree's PEP+ software performs ARC processing to originate ARC transactions onto the ACH network. The software must first determine if the item can be converted to an electronic transaction. It will be recognized that electronic transactions can be cleared faster and less expensively than paper items. Thus, it is desirable to convert as many paper items into electronic transactions as possible.

In converting a paper item to an electronic transaction, the automated processing of the software parses the MICR line information on the paper item to identify the routing transit number (RTN) and the account number portions. The determination as to if the item can be converted to an electronic transaction is made based upon one or both of the identified RTN and account number. This process is known as validation. Validation sometimes includes altering one or both of the RTN and the account number. The process involves verification of the RTN and the MICR line scheme. The MICR line scheme includes pattern and placement of MICR line information other than RTN information and amount information. The process may identify whether the information is valid and can be processed at all, whether the account is accessible through the ACH, or whether it can be converted to an account that can be accessed through the ACH. This determination is made because some accounts, such as those upon which money orders and balance transfer checks are drawn, while maintained by a financial institution reachable via the ACH network, are not themselves reachable via the ACH network. Alteration of an account number is then most often done to conform to a preferred scheme for an electronic transaction.

Likewise, for an incoming electronic transaction, the software executes similar automated processing to validate the identification of the paying financial institution and funding account number, both included in the received electronic transaction, and possibly altering one or more of these.

It has been found that it is beneficial for a remote client to perform at least a subset of the processing to convert a paper item to an electronic transaction. When a remote client performs some of the functions, a financial institution can more quickly and economically originate a transaction, as fewer processes must be performed by the financial institution and rejections back to the remote client are greatly reduced, if not eliminated. This reduces costs to both the remote client and the financial institution.

Some remote clients execute an algorithmic process to parse the MICR line information. This parsed information is then supplied to the financial institution for further processing and/or originating an ACH transaction. For example, LML Payment Systems sells software for use by a remote client in parsing MICR line information. In parsing MICR line information, this software must recognize MICR line patterns to properly identify the account numbers. Not only may there may be considerable variance in such patterns between different financial institutions, but the financial institutions may change their patterns as a result of bank mergers and acquisitions, changes to internal systems, etc. Unless this software is frequently updated, it cannot continue to parse reliably. This updating is expensive in subscription costs, man-hours, and software down time.

Other remote clients execute a process to validate the MICR line information (or portions thereof) of a paper item based on a database of recognized values (e.g., routing transit numbers) and schemes to perform at least some subset of validation and alteration processing as described above. Such a process may require a costly subscription service to a database and/or frequent updates from the database provider (which may be a financial institution which performs ACH origination for the remote client). Also, for both parsing software and validation databases, these tools are general tools in that the same information is distributed to all remote clients. There is no consideration of a particular remote client's customer base in providing information. Thus, a large amount of information, much of it which will remain unused, is distributed to all remote clients.

In view of the above, there is a need for a remote client solution for conversion of a paper item to an electronic transaction that is inexpensive, targeted, and does not require frequent software or data updates at a remote client.

A financial institution or other entity performing ACH origination (hereinafter simply referred to as "financial institution") often has several software solutions available for validating and/or altering financial account information, whether that be in the context of converting a deposited paper item to an electronic transaction, or in the context of verifying a received electronic transaction to be propagated to the ACH network. Different software solutions, offered by, for example, Thomson, CheckFree, and other vendors, have different levels of success in validating and/or altering MICR line information, as well as different costs to a financial institution. To date, there has been no method for a financial institution to select the best software solution to validate and/or alter a particular account number.

Accordingly, there is a need for an intelligent algorithm for deciding between available options for validating and/or altering an account number.

OBJECTS OF THE INVENTION

It is an object of the present invention to provide an improved technique for generation of electronic transactions.

It is another object of the present invention to provide an improved technique for conversion of a paper item to an electronic transaction.

Still another object of the present invention is to provide a technique to select between multiple options for validating and/or altering financial account information.

The above-stated objects, as well as other objects, features, and advantages, of the present invention will become readily apparent from the following detailed description which is to be read in conjunction with the appended drawings.

SUMMARY OF THE INVENTION

In accordance with the present invention, methods and systems are provided for processing information associated with a financial account. A financial account could be any type of account maintained by a financial institution on behalf of a depositor, such as a checking account, savings account, etc. A financial institution includes, but is not limited to, a bank, a credit union, and a savings and loan.

A system of the present invention includes one or more processors and one or more memories. A processor can be any type of processor capable of functioning to implement the techniques described herein, including, but not limited to, a processor as found in a typical personal computer, mainframe computer, server-type computer, or any other type computing device. A memory can be any type memory capable of storing data, including, floppy disk, hard disk, and optical disk.

In accordance with the present invention, multiple options are available for performing at least one of validating and altering information associated with a financial account. Validation is the process of determining if a funds transfer order can be completed electronically. The funds transfer order could be a paper funds transfer order, or an electronic funds transfer order. Oftentimes altering financial account information in some manner is also required to accomplish the funds transfer electronically.

A priority value for each of the plurality of options is determined. Determination of a priority value could include retrieving a priority value, or could include processing information, including, but not limited to, information associated with the financial account. The option having the highest priority value is selected. Thereafter, information associated with the financial account is processed in accord with the selected option.

In one aspect of the present invention, the information associated with the financial account includes at least one of an account number of the financial account and a routing transit number of a financial institution that maintains the financial account. Thus, this information is validated and/or altered in accordance with the selected option.

According to another aspect of the present invention, the priority value for each option is based upon at least one of two types of information. The first type of information is option preference information. Option preference information indicates the desirability for utilizing a particular option. Option preference information could be determined by a payor, by a payee, by a payor's financial institution, by a payee's financial institution, or by another entity.

The other type of information is results of processing the information associated with the account in accord with the particular option. That is, the information is processed in accord with each of the options. The results of executing each option may then be utilized in selecting one of the options.

In still another aspect, the priority value for each of option is associated with a plurality of criteria. That is, multiple factors are utilized in determining an option's priority value. Preferably, the same factors are utilized in determining each option's priority value.

In a further aspect of the present invention, the multiple factors for each option include at least two of four factors. The first factor is a preference for the option, as discussed above. The second factor is a relative success of the option in matching the account information to known account information. This is based upon executing each option and analyzing the results, as discussed above. The third factor is a success of the option in determining that the financial account can be electronically debited. The fourth factor is an amount of alteration of the account information performed by the option in matching the account information to known account information in association.

In an even further aspect, each of the at least two factors is associated with a priority. That is, one of the factors more heavily influences an option's priority value. Not all the factors are equal in importance. In this even further aspect, the option having the highest determined priority value is associated with at least one criteria having a highest value relative to the other options. That is, this at least one criteria has a highest value for the option with the highest determined priority value, whereas this at least one criteria has a lower value for the other option, or options.

According to yet another aspect of the present invention, a funds transfer order is received. This funds transfer order could be a paper funds transfer instrument or an electronic funds transfer directive.

A paper funds transfer instrument is a physical order to transfer funds. Typical examples of paper funds transfer instruments include checks and drafts. However, the present invention is not limited to such paper instruments.

An electronic funds transfer directive, often referred to as an electronic transaction, is an electronic order to debit funds from a payor's financial account and/or credit funds to a payee's financial account. Most electronic transactions are made via the ACH network, though other networks exist for electronic transactions and the present invention is not limited to electronic transactions via the ACH network.

In this other aspect, the financial account information is associated with the received funds transfer order. That is, the financial account information is contained on, or in, or obtainable based upon, the received order. The processing of the financial account information is associated with originating an ACH transaction to complete the funds transfer order. That is, selected option is performed as a part of completing the funds transfer order utilizing the ACH network.

According to a further aspect, the funds transfer order is a paper funds transfer order that is received from a remote location. The remote location could be associated with a merchant, a biller, or any other entity that receives a paper funds transfer order in payment. Additionally, the remote location could be associated with an entity that processing received funds transfer orders on behalf of the entity that received the funds transfer order as payment.

A data record is generated based at least in part upon the processing in accord with the selected option. The data record contains information for converting, at the remote location, another paper funds transfer instrument to an electronic transaction. That is, the data record is for use at the remote location to generate an electronic transaction from a paper instrument. The generated data record is transmitted to the remote location for future use.

According to a still further aspect, an electronic funds transfer directive is received from the remote location. This electronic funds transfer directive is generated based upon the transmitted data record. An ACH transaction is then originated based upon the received electronic funds transfer directive without performing the determination, selection, and processing in association with the received electronic funds transfer directive.

In another aspect of the present invention, altering the financial account information is associated with recognizing at least one of a scheme of MICR line information and a RTN of a financial institution at which the financial account is maintained.

It will also be understood by those skilled in the art that the invention is easily implemented using computer software. More particularly, software can be easily programmed, using routine programming skill, based upon the description of the invention set forth herein and stored on a storage medium which is readable by a computer processor to cause the processor to operate such that the computer performs in the manner described above.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF A PREFERRED EMBODIMENT

In accordance with the present invention, techniques to convert paper items to electronic transactions are provided, thus reducing manual processes and costs associated with processing paper items. Also in accordance with the present invention, techniques to select the best available option for validating and/or altering MICR line information are provided. Beneficially, the present invention can be, as desired, incorporated with existing software for originating ACH transactions. Or, as desired, existing software might not be utilized with the present invention. Further, as will be recognized by one of ordinary skill in the art, different aspects of the present invention can be utilized separately, or together.

Figure 1:
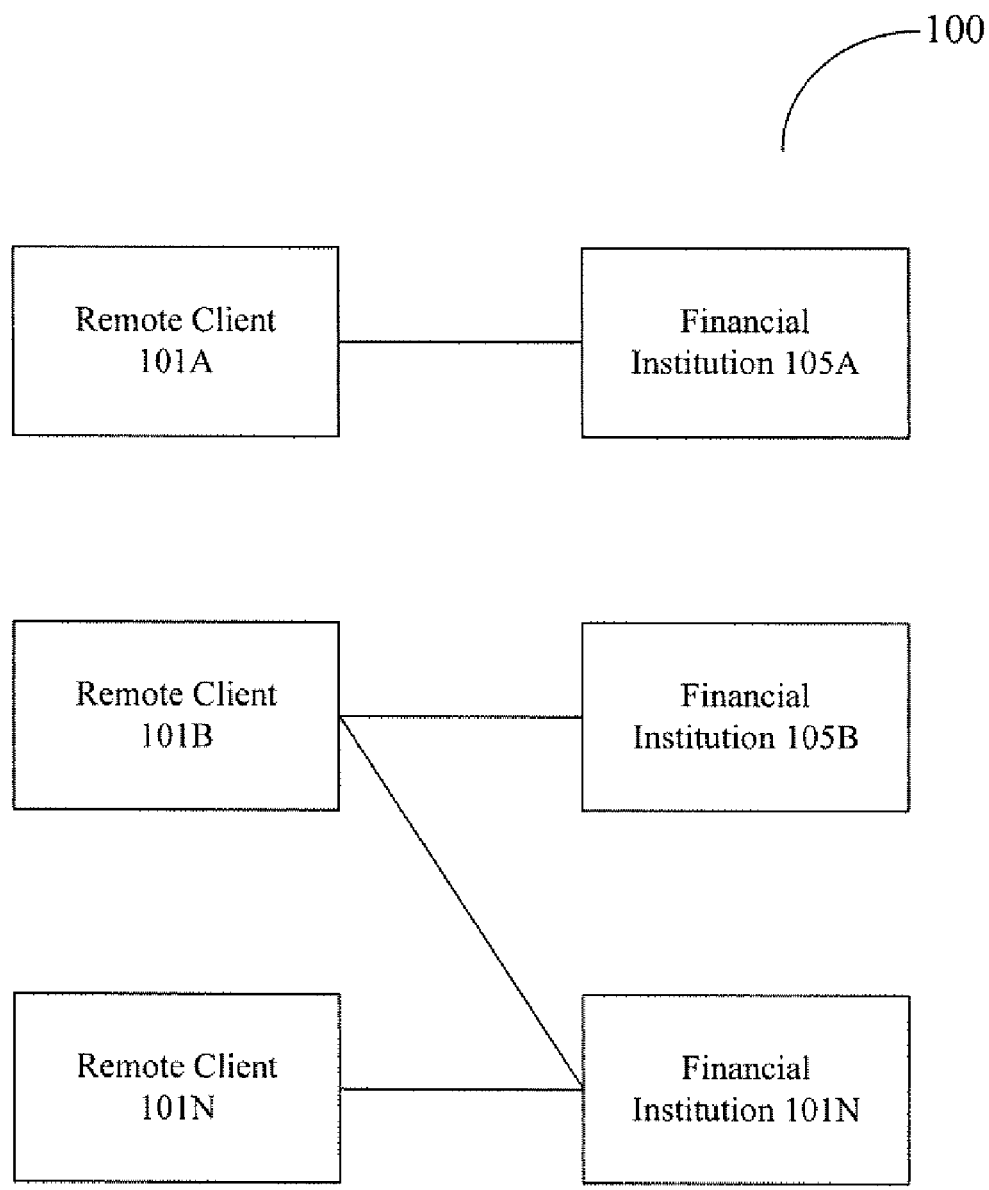
FIG. 1 is a simplified depiction of a network for processing information associated with financial accounts in accordance with certain aspects of the present invention.

FIG. 1 is a simplified depiction of a network 100 of remote clients 101A-101N and financial institutions 105A-105N which originate ACH transactions in accordance with certain aspects of the present invention. Network 100 could be, as desired, a dedicated private network, could be a public network, such as the Internet, or could be any other network. Also, network 100 could be a single logical network implemented by more than one physical network.

While FIG. 1 only shows three remote clients 101A-101N and three financial institutions 105A-105N, is should be understood that fewer than, or more than, three remote clients, as well as fewer than, or more than, three financial institutions might participate in network 100. Communications between remote clients 101A-101N and financial institutions 105A-105N are shown in solid lines.

It should also be understood that any given financial institution 105A-105N typically supports more than one remote client 101A-101N. Further, though less likely, any given remote client 101A-101N may utilize more than one financial institution 105A-105N. That is, a given remote client 101A-101N may have accounts at multiple ones of financial institutions 105A-105N. In view of this, FIG. 1 depicts remote client 101A in communication with only financial institution 105A, and vice versa. Also, FIG. 1 depicts remote client 101B in communication with both financial institution 105B and financial institution 105N, and remote client 101N in communication with only financial institution 105N.

Figure 2:
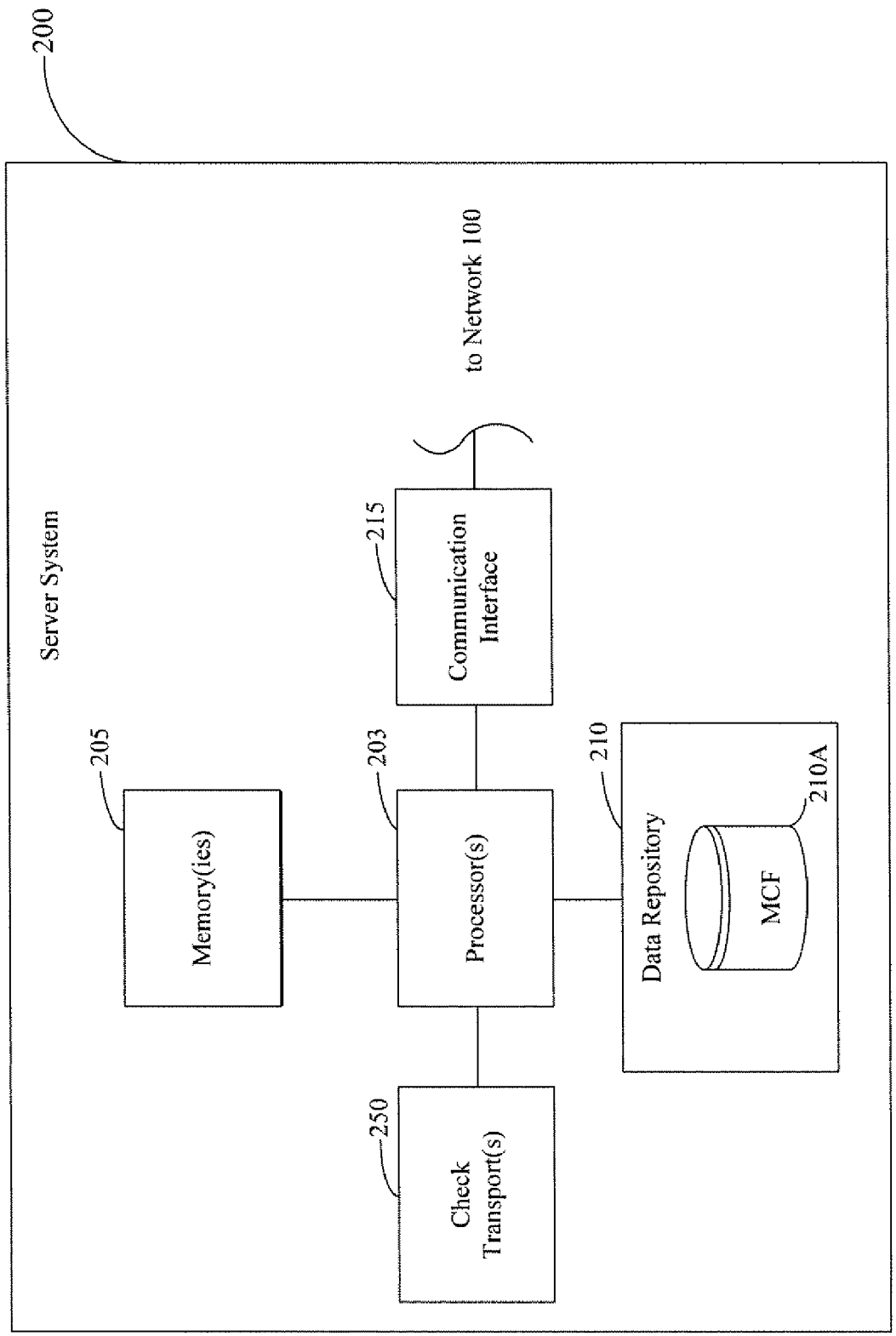
FIG. 2 is an exemplary depiction of a server system for use with the network of FIG. 1.

A computing system, preferably in the form of a server system, is located at each remote client 101A-101N. FIG. 2 is an exemplary depiction of a server system 200 located at a remote client 101A-101N. Each server system 200 consists of one or more processors 203 configured to execute programming instructions stored in at least one memory 205. Each server system 200 includes one or more communication interfaces 215 for transmitting and receiving data at least via the network 100. As desired, a communication interface 215 also transmits and/or receives data via one or more networks other than the network 100. Additionally, the computing system includes a data repository 210, which may reside on the server system 200, as shown in FIG. 2, other dedicated database servers, or elsewhere on a computing network. As desired, server system 200 can also perform functions and processes in addition to those described herein.

The data repository 210 includes at least one MICR Conversion File (MCF) 210A that stores information associated with converting paper items into electronic transactions. Each MCF 210A is received from a financial institution 105A-105N with which a particular remote client 101A-101N is associated. MCF data will be further discussed below. Other information may also, as desired, be stored in the data repository 210, though not shown in FIG. 2. Additionally, each server system 200 includes at least one check transport device 250, also to be further discussed below.

Figure 3:
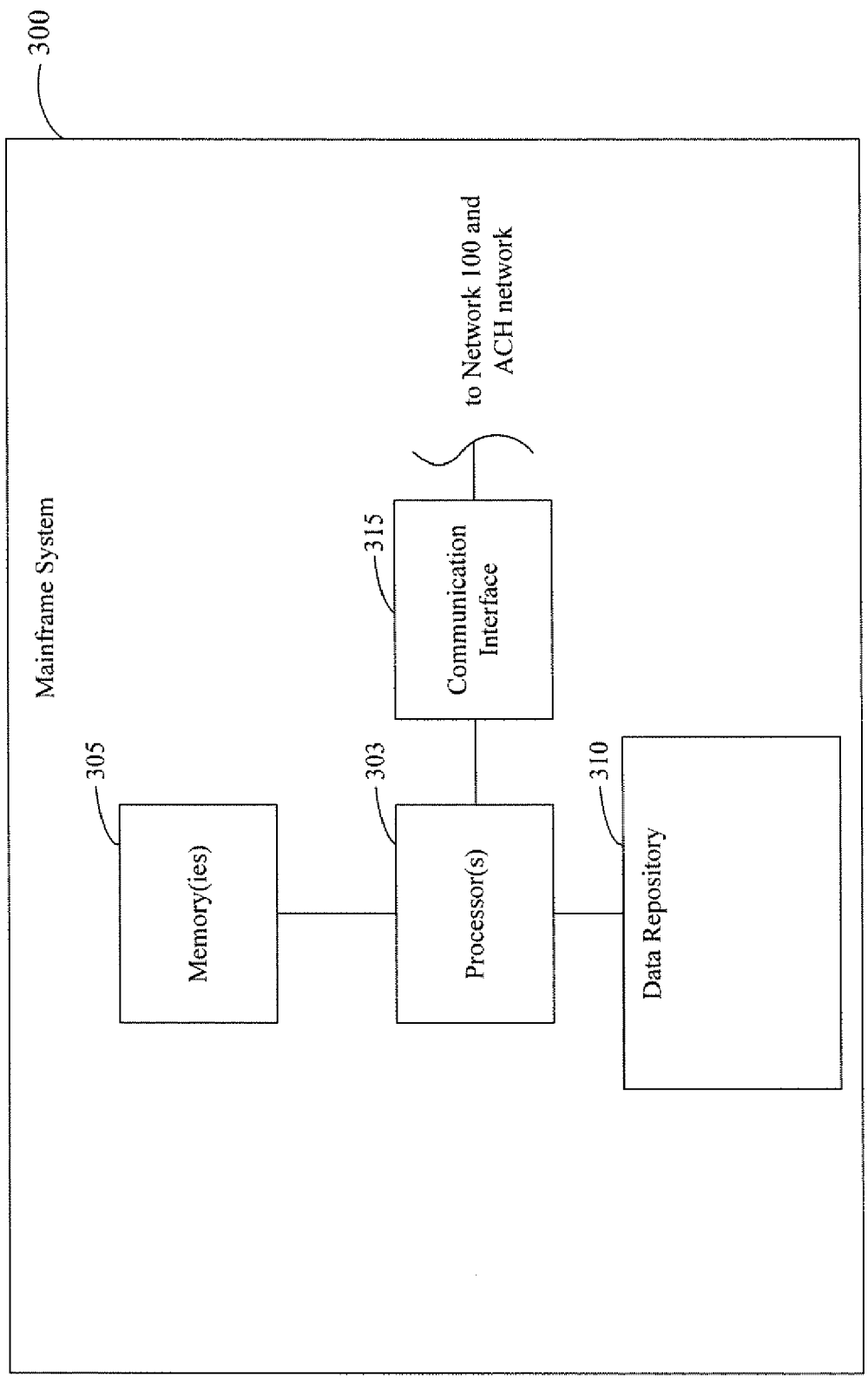
FIG. 3 is an exemplary depiction of a mainframe system for use with the network of FIG. 1.

A computing system, preferably in the form of a mainframe system, is located at each financial institution 105A-105N. Of course, as desired, one or more financial institution systems could be server systems. FIG. 3 is an exemplary depiction of a mainframe system 300 located at a financial institution 105A-105N. The mainframe system 300 includes one or more high-powered processors 303 configured to execute programming instructions stored in at least one memory 305. The mainframe system 300 also includes one or more communication interfaces 315 for transmitting and receiving data at least via the network 100. Preferably, a communication interface 315 also transmits and/or receives data via the ACH network. Additionally, the mainframe system 300 preferably includes a data repository 310. As desired, mainframe system 200 also performs functions and processes in addition to those described herein.

Each server system 200 of a remote client 101A-101N communicates with a mainframe system 300 at the financial institution 105A-105N which performs ACH origination for that remote client 101A-101N. Communications are made utilizing a communications interface 215 at a server system 200 and a communications interface 315 at a mainframe system 300. These communications travel via network 100.

A server processor 203 determines ACH conversion eligibility for paper items based upon programming stored in a memory 205. This programming will be referred to herein as the Applications Programming Interface (API). The API, which utilizes MCF 210A data, includes software components containing business logic and Electronic Remittance File (ERF) schema. An ERF is the file transmitted to a financial institution 105A-105N after a paper item (or items) has been converted to an electronic item. The schema are formats for ERFs.

An MCF 210A is a file containing data used to decision extracted information from a paper item's MICR line data. Preferably, MCF data identifies those schemes associated with account numbers known to be reachable via the ACH network. Alternatively, MCF data could, as desired, identify one or both of particular account numbers and particular routing numbers associated with financial institutions and/or particular accounts known to be reachable via the ACH network. MCF 210A data may be sensitive, and as such it is preferably transmitted to a server system 200 from a mainframe system 300 via the network 100 in encrypted form. The encryption can be, as desired, of any form sufficient to protect the MCF data. The business logic of the API contains the necessary logic to decrypt the MCF data.

It should be stressed that each financial institution 105A-105N is associated with MCF data associated with financial accounts on items processed through that financial institution. A financial institution creates new MCF data each processing day, or perhaps, as desired, a shorter or longer period, and transmits the newly created MCF data to each remote client 101A-101N from which that financial institution 105A-105N receives deposits. The receiving remote client 101A-101N then updates the stored MCF 210A based upon the newly received updated information. The update could be, as desired, in the form of a complete replacement of stored MCF data, or could encompasses only addition and/or deletion of stored MCF data.

The business logic of the API also contains all the necessary logic to read a RTN from parsed MICR information, decision a paper item for ACH eligibility using the stored MCF 210A, and return an eligibility code for ACH conversion. If the eligibility code indicates that the paper item can be converted to an electronic transaction, a server system 200 builds the ERF according to the ERF schema of the API. The server system 200 transmits the built ERF to a mainframe system 300 at a financial institution 105A-105N for further processing in originating the electronic transaction onto the ACH network.

As desired, a built ERF corresponding to a single item can be transmitted to a mainframe system 300 upon completion of the building. However, preferably, built ERF data for separate items are accumulated throughout a period, such as a processing day, and then ERF data for these separate items are transmitted as a single file to a financial institution 105A-105N.

Figure 4:
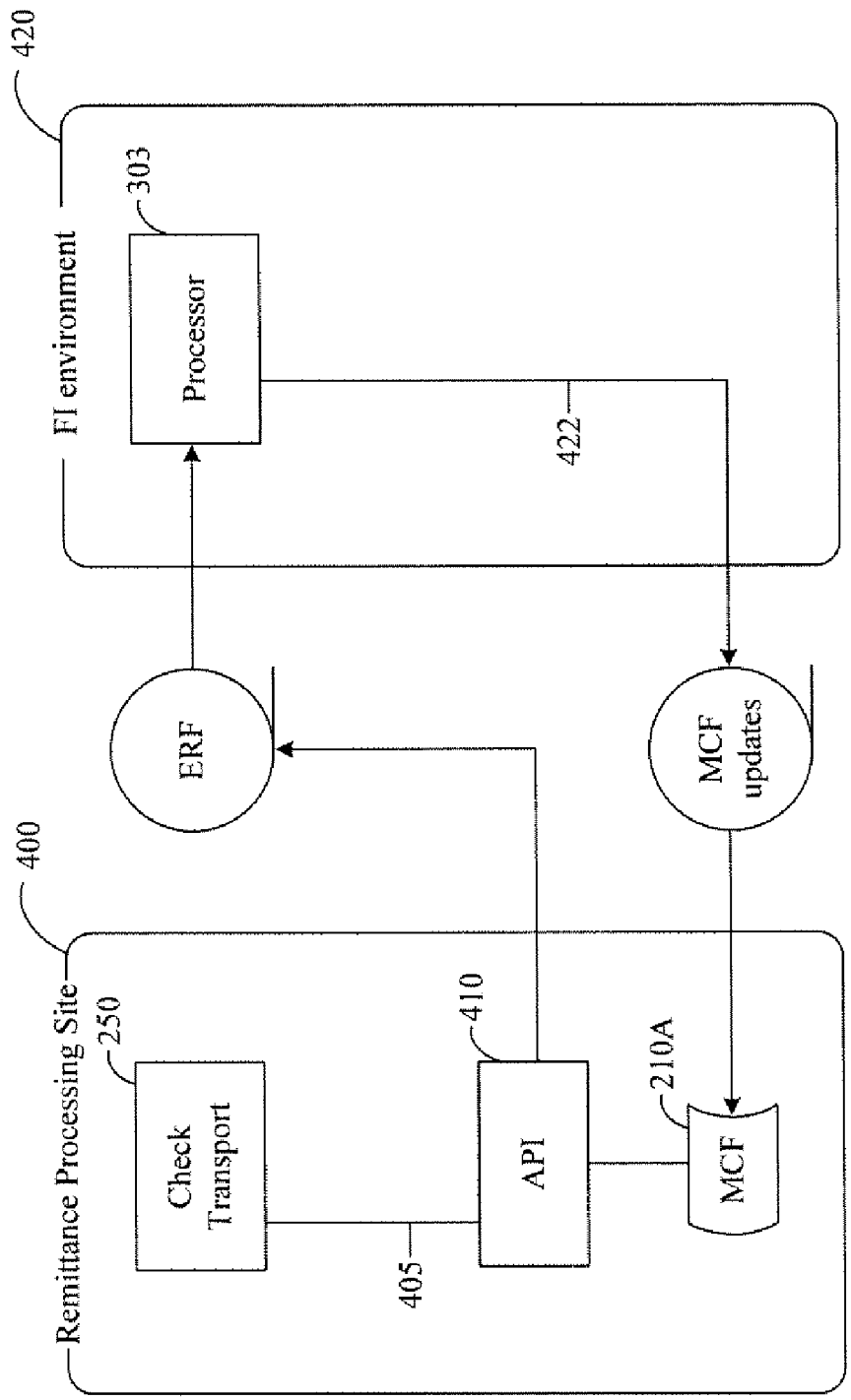
FIG. 4 is an overview of operations to decide ACH conversion eligibility for paper instruments in accordance with certain aspects of the present invention.

FIG. 4 is an overview of the operations of the present invention to decide ACH conversion eligibility for paper items. As shown, at a remittance processing site 400, i.e., a remote client 101A-101N, a received paper instrument is read by a check transport 250. More particularly, the check transport 250 reads the MICR line data from the paper item. This MICR data is then passed, at 405, to a server processor 203 running the API 410.

The API 410 reads certain MICR line information, to be discussed below, and compares this read MICR line information to data stored in the MCF 210A. The status of the paper item as being ACH convertible is decided by the API 410 based upon the information contained in the MCF 210A. That is, the API 410 determines if the certain MICR line information corresponds to information in the MCF 210A. The API 410 returns an appropriate eligibility code to be used in building on ERF if it is determined that the paper item is convertible.

There is minimal parsing of the received MICR line data by the API 410. Based upon a well-accepted standard for placement of a RTN in a MICR line, a RTN can easily be identified from MICR line information. Likewise, based upon a well-accepted standard, the amount field is always located at the end of the MICR line. As a result of these known conventions, the only required parsing is an extraction of the RTN and a stripping and elimination of the amount field. The remainder of the MICR line information is used to decision against the MCF 210A. Preferably, a check number and miscellaneous special characters are left in the MICR line information and are 'masked out' by data (the pattern in the corresponding entry in the MCF 210A) rather than by processing logic. As a result, the parsing logic does not need to be periodically updated and is not complex.

An ERF is then built incorporating the returned eligibility code and transmitted, at 418, to a financial institution 105A-105N, shown in FIG. 4 as FI environment 420. This building could be performed by a server system 200, or the building could be performed by another computing device at the remittance processing site.

A mainframe processor 303 at the receiving financial institution 105A-105N then converts eligible items to ACH transactions. A financial institution 105A-105N mainframe processor 303 also updates MCF data, as necessary, based upon received ERFs and paper items, 422. It should be noted that the accounts identified in a particular MCF 210A are those to which the financial institution 105A-105N maintaining that MCF 210A has directed at least one electronic transaction. Thus, MCF data is inherently self-maintaining. Because MCF data stored at a remote client 101A-101N is based on historical experience and its scope is restricted, it will require progressively fewer and fewer updates (perhaps monthly at most) from a financial institution 105A-105N overtime.

Figure 5:
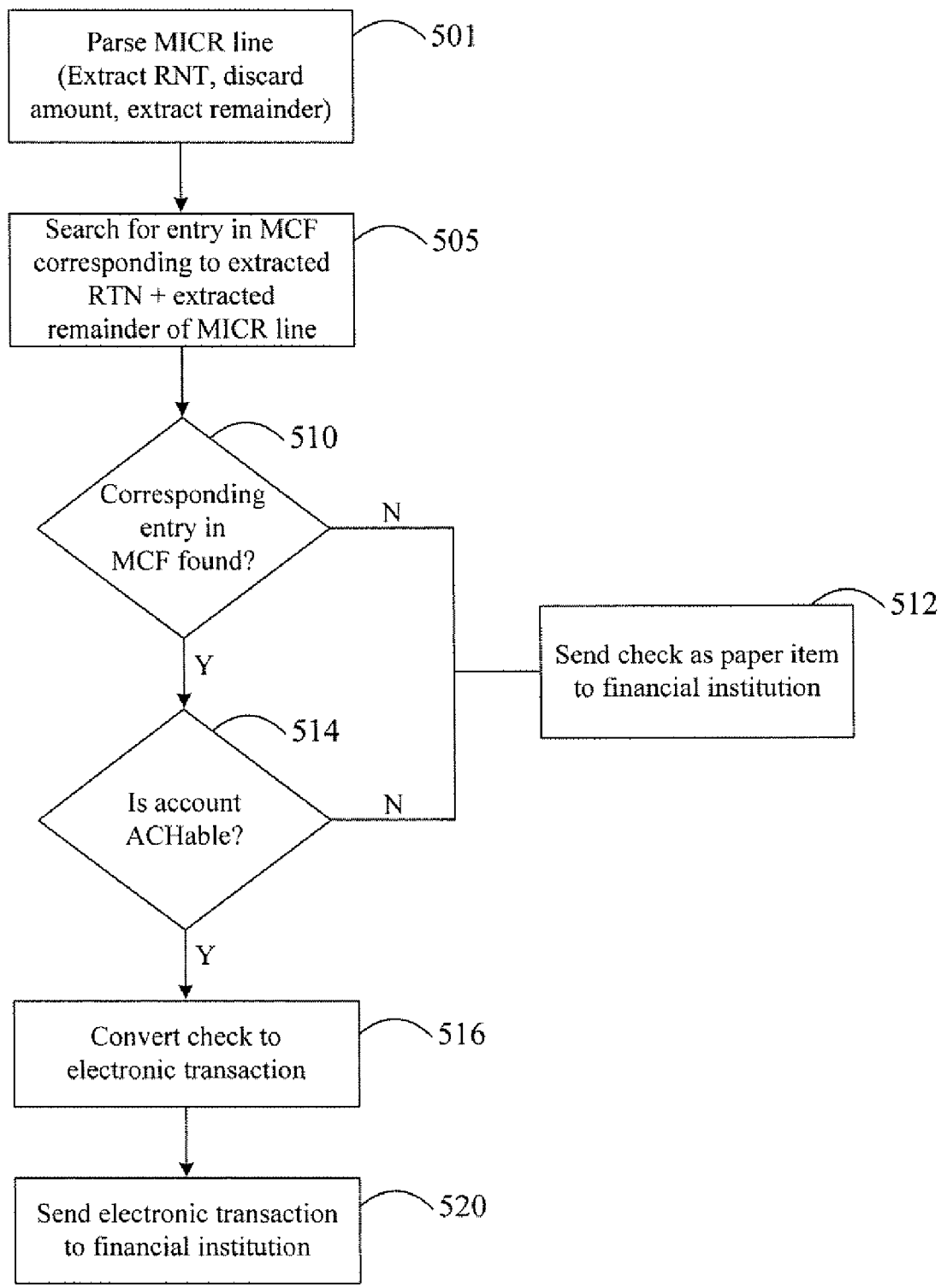
FIG. 5 is a further depiction of some of the operations depicted in FIG. 4 in accordance with certain aspects of the present invention.

FIG. 5 shows in more detail the processing of a paper item at a remote client 101A-105N. At step 501 MICR line data is parsed, as described above. Next, at step 505, the API 410 searches for an entry in the MCF 210A corresponding to the remaining MICR line data. The API 410 determines, at step 510, whether a corresponding entry in the MCF 210A has been found.

If a corresponding entry has not been found, operations continue with step 512, in which the paper item is physically sent to a financial institution 105A-105N for processing. If the API 410 determines that a corresponding entry has been found, at step 514 the API 410 determines if the entry indicates that the account upon which the paper item is drawn is reachable via the ACH network. If not, operations continue with step 512. If so, operations continue with step 516 in which the paper item is converted into an electronic transaction (an ERF is built). Then, the electronic transaction is transmitted to a financial institution 105A-105N via the network 100, step 520. Thereafter, the financial institution 105A-105N originates the electronic transaction onto the ACH network.

Figure 6:
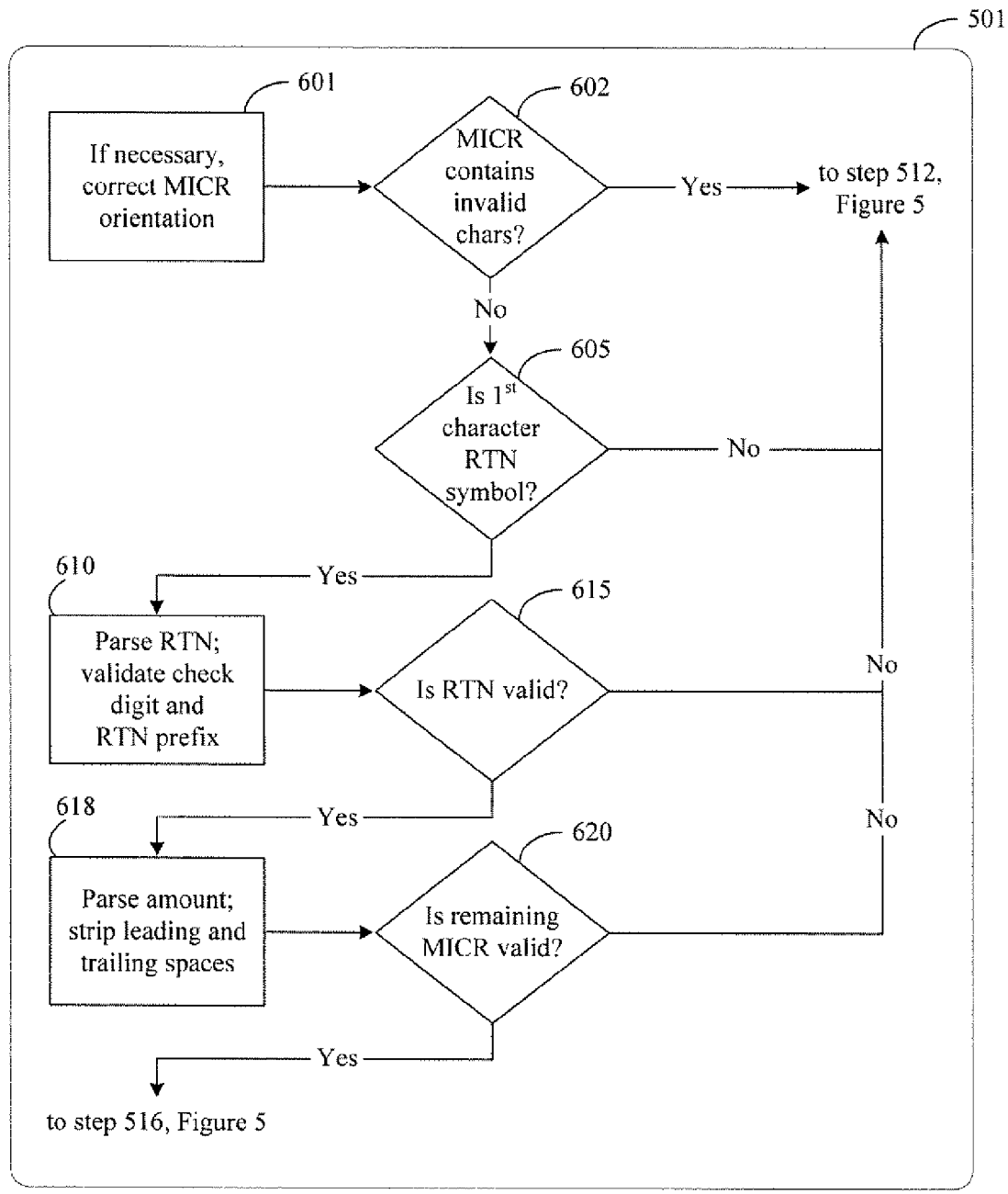
FIG. 6 is a still further depiction of some of the operations depicted in FIG. 5 in accordance with certain aspects of the present invention.

FIG. 6 shows step 501 in more detail. At step 601 the API 410, as necessary, corrects MICR orientation. Next, at step 602, the API 410 determines if the MICR line data contains invalid characters. If so, operations continue with step 512, discussed above. If not, the API 410 determines if the first character in the MICR line data is an RTN symbol. If not, operations continue with step 512. If so, operations continue with step 610.

At step 610 the API 410 parses the RTN and validates a check digit and RTN prefix. The API 410 then determines, at step 615, if the RTN is valid, based upon the results of step 610. If not, operations continue with step 512. If so, operations continue with step 618 in which the API 410 parses the amount from the MICR line data, including stripping leading and trailing spaces. At step 620 the API 410 then determines if the remaining MICR line data is valid. If not, operations continue with step 512. If so, operations continue with step 516, discussed above.

Figure 7:
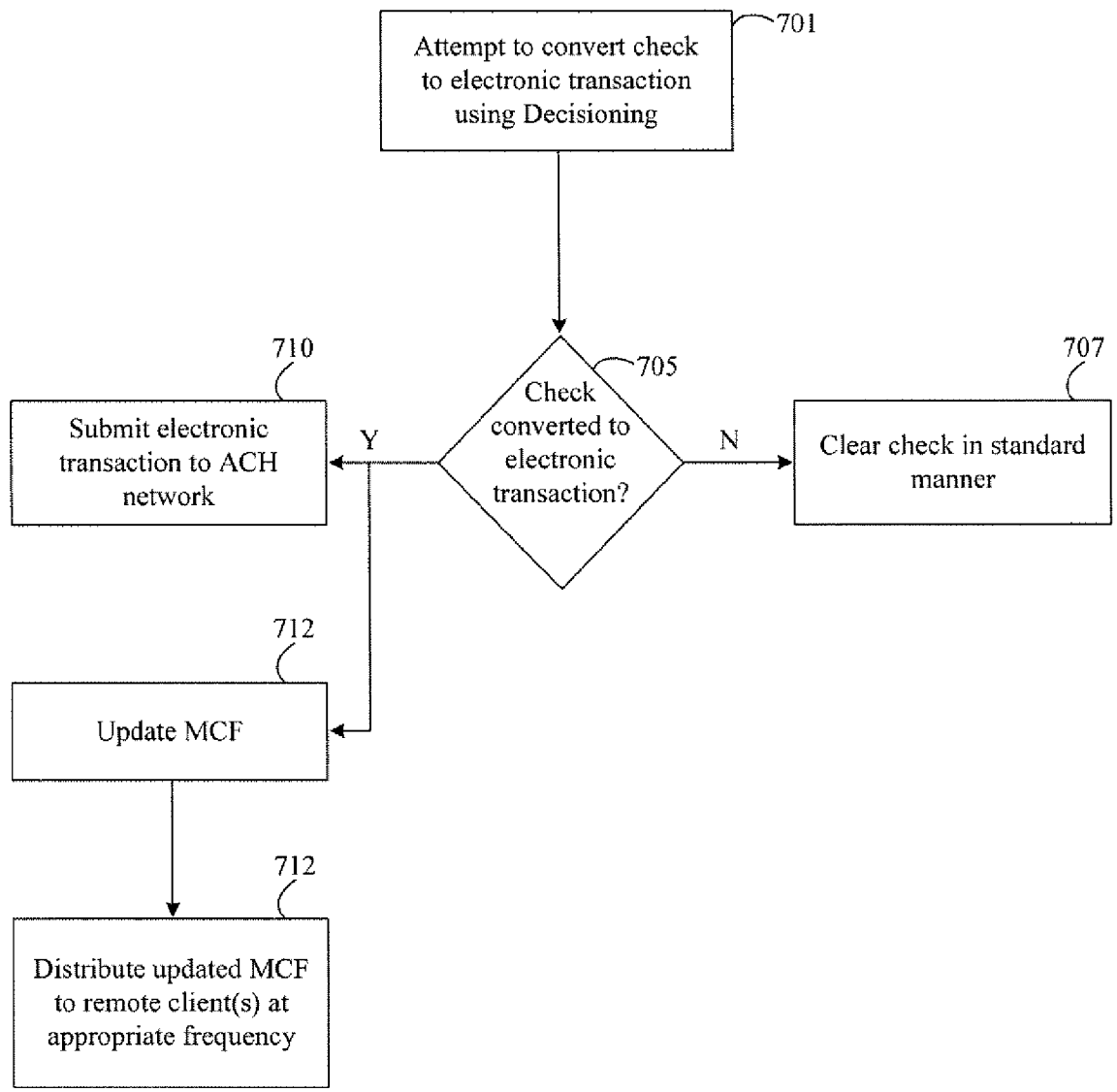
FIG. 7 is another further depiction of some of the operations depicted in FIG. 4 in accordance with certain aspects of the present invention.

FIG. 7 is a simplified depiction of a portion of the processing performed at a financial institution 105A-105N for those paper items not converted to electronic transactions by a remote client 101A-101N. That is, processing performed for those paper items delivered to a financial institution 105A-105N in step 512 of FIG. 5. At step 701 a mainframe processor 303 attempts to convert the paper item to an electronic transaction based upon the Decisioning Module, to be discussed further below. Of course, other processing different than that of the Decision Module could be utilized, as desired, to convert the paper item to an electronic transaction. At step 705 the processor 303 determines if the paper item was successfully converted to an electronic transaction. If not, operations continue with step 707, in which the paper item is cleared in a conventional manner.

If at step 705 it is determined that the paper item was successfully converted, operations depicted in steps 710 and 712 follow. In step 710 the successfully converted paper item, i.e., the electronic transaction, is submitted onto the ACH network for clearing. At step 712 the MCF data of that financial institution 105A-105N is updated. In other words, information associated with the financial institution and/or account upon which the converted paper item is drawn is added to the MCF data. At step 715 the updated MCF data is distributed to each remote client 101A-101N associated with that financial institution 105A-105N.

The Decisioning Module is a part of the programming of a mainframe system 300. The Decisioning Module selects between several available options for financial account validation and/or alteration. This validation and/or alteration could be in association with a received paper instrument, or a received electronic transaction. In a preferred embodiment, the Decisioning Module dynamically creates a 4-digit field for each option as a result of predefined preferences and/or executing each option. An option is selected based upon a comparison of the created 4-digit fields. The option associated with a 4-digit field having the highest value is the selected option. Of course, as desired, the Decisioning Module could utilize other processing to select an option.

In the preferred embodiment, the left-most digit position is the highest (first) order position, and the right-most digit position is the lowest (fourth) order digit position. A Forced Override value resides in the highest (first) order position. A large value digit in this position (based on a financial institution 105A-105N preference for a particular option) will cause the overall field to have a high value and thus force the use of that particular option. Preferably, a Forced Override value is set for certain processing contexts—i.e., for certain deposits of corporate customers, for certain types of transactions, etc. However, as desired, a system-wide Forced Override value could be utilized such that a same option, no matter a processing context, will have be the same. In the preferred embodiment, only one option may be associated with a largest value digit, such as a nine. The first order position of the remaining options may be, as desired, associated with any other digit other than the largest value digit (or any digit larger than the largest value digit).

A Matching value resides in the next (second) order position. The digit in this position indicates the relative success of RTN and/or account number validation. A large value digit, such as nine, in this position indicates completely successful matching of the RTN and scheming of the account number (based on a primary scheme). A value of zero indicates that no match was made to known account information. Intermediate values indicate different levels of partial matching (e.g., RTN or account number matching only) or matching based on secondary schemes.

An ACH value resides in the next (third) order position. This is a binary value, with 0 indicating the account cannot be reached through the ACH network, or be altered to be so reached, and 1 indicating the account can be reached through the ACH network, or be altered to be so reached. It should be stressed that this value is the result of the operations of a particular method. One option might return a 1, while another option might return a 0.

An Alteration value resides in the next (fourth) order position. The value in this position indicates the amount of alteration performed as a result of that option. A value of zero indicates no alteration was performed. A large value digit indicates both the RTN and the account number were altered. Intermediate values indicate either the RTN or the account number (but not both) was altered, with the larger value given to the alteration of the account number.

Figure 8:
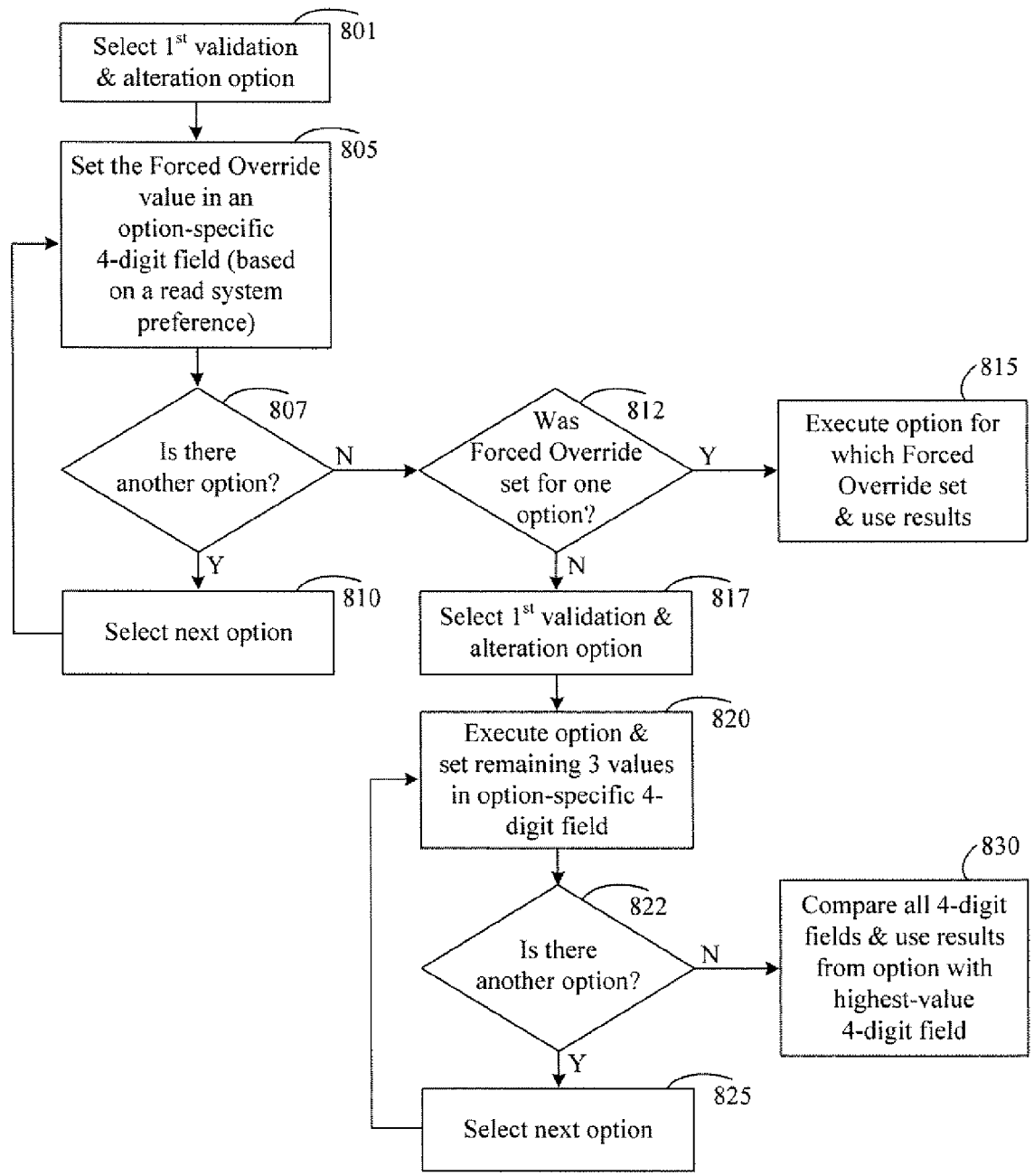
FIG. 8 is an overview of operations to select one of a plurality of options for validating and/or altering financial account information in accordance with certain aspects of the present invention.

FIG. 8 is a high-level depiction of the processing of the Decisioning Module. At step 801a first one of multiple available validation and/or alteration options is selected. Then, in step 805, the Forced Override value is set in the 4-digit field for the selected option. The Forced Override value for each option is preferably stored in a mainframe data repository 310. At step 807 the Decisioning Module determines if another option exists. If so, operations continue with step 810 in which the next available validation and/or alteration option is selected. Thereafter, the operations of steps 805 and 807 continue until the Forced Override value has been set for each option.

If at step 807 it is determined that no other options exist, operations continue with step 812 in which the Decisioning Module determines if one of the options has a Forced Override value equal to the largest value digit available for the first position. If so, operations continue with step 815 in which the option having the largest value digit available as the Forced Override value is executed. That is, the item is validated and/or altered utilizing this option in originating the transaction onto the ACH network.

If at step 812 it is determined that no option has the largest value digit as the Forced Override value, operations continue with step 817 in which the processor 303 selects the first validation and/or alteration option. At step 820 the processor 303 executes the selected option and sets the remaining three values in that options 4-digit field based upon the results of the execution. Then, at step 822, the processor 303 determines if there exists another option to execute. If so, operations continue with step 825 in which the next option is selected. Operations then continue with steps 820 and 822 until each available option has been executed and the remaining three values in each respective 4-digit field have been set.

After each 4-digit field has been completed, operations continue with step 830 in which the sum of the digits of each 4-digit field is determined by the processor 303. The processor 303 selects the option associated with the 4-digit field having the highest sum. Thereafter, the item is originated onto the ACH network based upon the option associated with the highest sum. Alternatively, as desired, a sum procedure might not be utilized. Instead, the face value of the 4-digit fields could be compared.

As desired, information associated with the selected option could be incorporated into a data record and transmitted to a remote client 101A-101N for use in converting paper items to electronic transactions by that remote client 101A-101N. Beneficially, the Decisioning Module would not have to be invoked for such received electronic transactions.

Although not shown in the logic flow of FIG. 8, the Decisioning Module contains tie-breaking rules that may have to be exercised if two or more sums are equal. These rules, similar to Forced Override values, force the use of one option when two or more options are associated with equal sums (or face values).

The present invention is not to be limited in scope by the specific embodiments described herein. Indeed, various modifications of the present invention in addition to those described herein will be apparent to those of skill in the art from the foregoing description and accompanying drawings. Thus, such modifications are intended to fall within the scope of the appended claims.

What is claimed is:

1. A computer-implemented method, comprising:
    receiving a financial transaction comprising an account identifier comprising at least one of a financial account number or a routing transit number, wherein the financial transaction is to be processed using any of a plurality of options for performing at least one of validation of the account identifier or alteration of the account identifier, wherein the processing is performed to determine whether the financial transaction is convertible to an electronic transaction;
    determining, for each of the plurality of options, a value that represents at least one factor selected from the group consisting of: (i) a preference for the respective option, (ii) a relative success in matching at least a portion of the account identifier, (iii) accessibility through an automated clearing house network of an account corresponding to the account identifier, and (iv) a relative amount of alteration of the account identifier;
    selecting one of the plurality of options based at least in part on a comparison of the respective values for each of the plurality of options; and
    determining whether the financial transaction is convertible to an electronic transaction based at least in part on processing the financial transaction using the selected one of the plurality of options;
    wherein the prior steps are performed by one or more financial processing computers.

2. The method of claim 1, further comprising converting the financial transaction to an electronic transaction subsequent to processing the financial transaction using the selected one of the plurality of options, wherein the prior step is performed by one or more financial processing computers.

3. The method of claim 1, wherein determining the value that represents the at least one factor is based at least in part on at least one of (i) a customer type identifier, (ii) a transaction identifier, or (iii) at least a portion of the account identifier.

4. The method of claim 1, wherein the respective value for each of the plurality of options represents at least a preference for the respective option, and the respective preference for the respective option is determined at least in part by one of (i) a payor, (ii) a payee, (iii) the payor's financial institution, or (iv) the payee's financial institution.

5. The method of claim 1, wherein the respective value for each of the plurality of options represents at least a preference for the respective option comprising one of (i) a relative value or (ii) an absolute value.

6. The method of claim 1, wherein determining, for each of the plurality of options, the value that represents the at least one factor comprises determining a multiple digit field, wherein each digit represents a factor value for one of the at least one factor and wherein the relative position of each digit indicates the relative importance of the respective factor in selecting the one of the plurality of options.

7. The method of claim 1, wherein determining, for each of the plurality of options, the value that represents the at least one factor comprises determining a factor value for each of at least two factors selected from the group consisting of: (i) the preference for the respective option, (ii) the relative success in matching at least a portion of the account identifier, (iii) the accessibility through an automated clearing house network of an account corresponding to the account identifier, and (iv) the relative amount of alteration of the account identifier, wherein selecting the one of the plurality of options comprises (i) selecting the one of the plurality of plurality of options comprising a factor value having a highest priority or (ii) selecting the one of the plurality of options comprising a highest sum of factor values.

8. The method of claim 1, wherein determining, for each of the plurality of options, the value that represents the at least one factor comprises processing the financial transaction using each of the plurality of options and determining the value for each of the plurality of options based at least in part on the results of processing the financial transaction using each of the plurality of options.

9. The method of claim 1, wherein the financial transaction comprises a funds transfer order comprising one of a paper funds transfer instrument or an electronic funds transfer directive, and further comprising:
    converting the financial transaction to an electronic transaction; and
    originating the electronic transaction to an automated clearing house network to complete the funds transfer order; wherein the prior steps are performed by one or more financial processing computers.

10. The method of claim 9, wherein the financial transaction comprises a first financial transaction comprising a first paper funds transfer instrument received from a remote location, and further comprising:
    generating, based at least in part on converting the first paper funds transfer instrument to an electronic transaction, a data record to facilitate converting a second paper funds transfer instrument to an electronic funds transfer directive associated with the second paper funds transfer instrument at the remote location, wherein the first paper funds transfer instrument and the second paper funds transfer instrument are drawn on accounts at a same financial institution; and transmitting the data record to the remote location;

wherein the prior steps are performed by one or more financial processing computers.

11. The method of claim 10, wherein the electronic transaction comprises a first electronic transaction originated to an automated clearing house network, and further comprising:

receiving, from the remote location, the electronic funds transfer directive associated with the second paper funds transfer instrument, wherein the electronic funds transfer directive associated with the second paper funds transfer instrument is generated from the second paper funds transfer instrument based upon the data record;

converting the electronic funds transfer directive associated with the second paper funds transfer instrument to a second electronic transaction; and originating the second electronic transaction to the automated clearing house network without determining a value, selecting one of the plurality of options, and determining whether the second paper funds transfer instrument can be converted to the second electronic transaction for the electronic funds transfer directive associated with the second paper funds transfer instrument and received from the remote location;

wherein the prior steps are performed by one or more financial processing computers.

12. A system, comprising:

a memory comprising computer-executable instructions;

a communications interface operable to receive a financial transaction comprising an account identifier comprising at least one of a financial account number or a routing transit number, wherein the financial transaction is to be processed using any of a plurality of options for performing at least one of validation of the account identifier or alteration of the account identifier, wherein the processing is performed to determine whether the financial transaction is convertible to an electronic transaction; and a processor in communication with the communications interface and the memory, wherein the processor executes the computer executable instructions to perform the operations of:

determining, for each of the plurality of options, a value that represents at least one factor selected from the group consisting of: (i) a preference for the respective option, (ii) a relative success in matching at least a portion of the account identifier, (iii) accessibility through an automated clearing house network of an account corresponding to the account identifier, and (iv) a relative amount of alteration of the account identifier;

selecting one of the plurality of options based at least in part on a comparison of the respective values for each of the plurality of options; and determining whether the financial transaction is convertible to an electronic transaction based at least in part on processing the financial transaction using the selected one of the plurality of options.

13. The system of claim 12, wherein the processor further executes the computer-executable instructions to perform the operations of converting the financial transaction to an electronic transaction subsequent to processing the financial transaction using the selected one of the plurality of options.

14. The system of claim 12, wherein the value that represents the at least one factor is determined based at least in part on at least one of (i) a customer type identifier, (ii) a transaction identifier, or (iii) at least a portion of the account identifier.

15. The system of claim 12, wherein the respective value for each of the plurality of options represents at least a preference for the respective option, and the respective preference for the respective option is determined at least in part by one of (i) a payor, (ii) a payee, (iii) the payor's financial institution, or (iv) the payee's financial institution.

16. The system of claim 12, wherein the respective value for each of the plurality of options represents at least a preference for the respective option comprising one of (i) a relative value or (ii) an absolute value.

17. The system of claim 12, wherein the processor further executes the computer-executable instructions to perform the operations of:

determining, for each of the plurality of options, the value that represents the at least one factor comprises determining a multiple digit field, wherein each digit represents a factor value for one of the at least one factor, and wherein the relative position of each digit indicates the relative importance of the respective factor in selecting the one of the plurality of options.

18. The system of claim 12, wherein the processor further executes the computer-executable instructions to perform the operations of:

determining, for each of the plurality of options, the value that represents the at least one factor comprises determining a factor value for at least two factors selected from the group consisting of: (i) the preference for the respective option, (ii) the relative success in matching at least a portion of the account identifier, (iii) the accessibility through an automated clearing house network of an account corresponding to the account identifier, and (iv) the relative amount of alteration of the account identifier; and selecting (i) the one of the plurality of plurality of options comprising a factor value having a highest priority or (ii) the one of the plurality of options comprising a highest sum of factor values.

19. The system of claim 12, wherein the processor further executes the computer-executable instructions to perform the operations of:

processing the financial transaction using each of the plurality of options; and determining the value for each of the plurality of options based at least in part on the results of processing the financial transaction using each of the plurality of options.

20. The system of claim 12, wherein the financial transaction comprises a funds transfer order comprising one of a paper funds transfer instrument or an electronic funds transfer directive, and wherein the processor further executes the computer-executable instructions to perform the operations of:

converting the financial transaction to an electronic transaction; and originating the electronic transaction to an automated clearing house network to complete the funds transfer order.

21. The system of claim 20, wherein the financial transaction comprises a first financial transaction comprising a first paper funds transfer instrument received from a remote location; and wherein the processor further executes the computer-executable instructions to perform the operations of:

generating, based at least in part converting the first paper funds instrument to an electronic transaction, a data record to facilitate converting a second paper funds transfer instrument an electronic funds transfer directive associated with the second paper funds transfer instrument at the remote location, wherein the first paper funds transfer instrument and the second paper funds transfer instrument are drawn on accounts at a same financial institution; and causing the data record to be transmitted to the remote location.

22. The system of claim 21, wherein the electronic transaction comprises a first electronic transaction originated to an automated clearing house network, and wherein:

the communications interface is further operable to receive the electronic funds transfer directive associated with the second paper funds transfer instrument from the remote location, wherein the electronic funds transfer directive associated with the second paper funds transfer instrument is generated from the second paper funds instrument based upon the data record;

the processor further executes the computer-executable instructions to perform the operations of:

converting the electronic funds transfer directive associated with the second paper funds transfer instrument to a second electronic transaction; and originating the second electronic transaction to the automated clearing house network without determining a value, selecting one of the plurality of options, and determining whether the second paper funds transfer instrument can be converted to the second electronic transaction for the electronic funds transfer directive associated with the second paper funds transfer instrument received from the remote location.

23. A system, comprising:

means for receiving a financial transaction comprising an account identifier comprising at least one of a financial account number or a routing transit number, wherein the financial transaction is to be processed using any of a plurality of options for performing at least one of validation of the account identifier or alteration of the account identifier, wherein the processing is performed to determine whether the financial transaction is convertible to an electronic transaction;

means for determining, for each of the plurality of options, a value that represents at least one factor selected from the group consisting of: (i) a preference for the respective option, (ii) a relative success in matching at least a portion of the account identifier, (iii) accessibility through an automated clearing house network of an account corresponding to the account identifier, and (iv) a relative amount of alteration of the account identifier;

means for selecting one of the plurality of options based at least in part on a comparison of the respective values for each of the plurality of options; and means for determining whether the financial transaction is convertible to an electronic transaction based at least in part on processing the financial transaction using the selected one of the plurality of options.

* * * * *

UNITED STATES PATENT AND TRADEMARK OFFICE
CERTIFICATE OF CORRECTION

PATENT NO. : 7,640,197 B1 Page 1 of 1
APPLICATION NO. : 10/830455
DATED : December 29, 2009
INVENTOR(S) : Gentry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1290 days.

Signed and Sealed this

Twenty-first Day of December, 2010

David J. Kappos
*Director of the United States Patent and Trademark Office*